US008125478B2

(12) United States Patent
Lin et al.

(10) Patent No.: US 8,125,478 B2
(45) Date of Patent: Feb. 28, 2012

(54) LIQUID CRYSTAL DISPLAY AND SWITCHING VOLTAGE CONTROLLING CIRCUIT THEREOF FOR REDUCING OCCURRENCE OF COLOR ERRORS

(75) Inventors: Shu-Yang Lin, Yunlin County (TW); Jiao-Lin Huang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 762 days.

(21) Appl. No.: 12/211,109

(22) Filed: Sep. 16, 2008

(65) Prior Publication Data

US 2009/0278780 A1 Nov. 12, 2009

(30) Foreign Application Priority Data

May 8, 2008 (TW) ................................ 97116984 A

(51) Int. Cl.
*G06F 3/038* (2006.01)

(52) U.S. Cl. .......................................... 345/212; 345/87

(58) Field of Classification Search .................. 345/212, 345/211, 87, 52
See application file for complete search history.

(56) References Cited

U.S. PATENT DOCUMENTS

| | | | | |
|---|---|---|---|---|
| 5,066,945 | A * | 11/1991 | Kanno et al. | 345/101 |
| 7,109,965 | B1 * | 9/2006 | Lee et al. | 345/92 |
| 7,123,234 | B2 * | 10/2006 | Moon et al. | 345/100 |
| 7,224,353 | B2 * | 5/2007 | Song et al. | 345/211 |
| 7,375,718 | B2 * | 5/2008 | Kim | 345/100 |
| 7,561,136 | B2 * | 7/2009 | Hong et al. | 345/211 |
| 7,705,820 | B2 * | 4/2010 | Park | 345/100 |
| 7,898,514 | B2 * | 3/2011 | Kim | 345/92 |
| 2004/0263447 | A1 | 12/2004 | Hong et al. | |
| 2004/0263452 | A1 | 12/2004 | Kim | |
| 2006/0132417 | A1 * | 6/2006 | Shigenobu et al. | 345/98 |
| 2008/0074404 | A1 * | 3/2008 | Sashida | 345/204 |
| 2008/0122768 | A1 * | 5/2008 | Jung et al. | 345/87 |
| 2008/0158130 | A1 * | 7/2008 | Masuko et al. | 345/98 |
| 2008/0259010 | A1 * | 10/2008 | Ma | 345/87 |

FOREIGN PATENT DOCUMENTS

| | | |
|---|---|---|
| JP | 10333642 | 12/1998 |
| JP | 2000089193 | 3/2000 |

* cited by examiner

*Primary Examiner* — Chanh Nguyen
*Assistant Examiner* — Adam J Snyder
(74) *Attorney, Agent, or Firm* — Jianq Chyun IP Office

(57) ABSTRACT

A liquid crystal display (LCD) and a switching voltage controlling circuit thereof are provided. The LCD includes a display panel and a number of gate drivers. The switching voltage controlling circuit includes a current-controlled switch, a transmission line, and a feedback circuit. A first terminal and a second terminal of the current-controlled switch are respectively coupled to a constant voltage and a first terminal of the transmission line. The transmission line is serially coupled to the gate drivers. Each of the gate drivers generates a switching voltage according to a voltage provided by the transmission line and controls pixel units of the display panel. The feedback circuit regulates an amount of a current passing through the current-controlled switch according to a voltage difference between the first terminal and a second terminal of the transmission line. Thereby, color errors occurring between blocks of the display panel can be reduced.

6 Claims, 7 Drawing Sheets

LIQUID CRYSTAL DISPLAY AND SWITCHING VOLTAGE CONTROLLING CIRCUIT THEREOF FOR REDUCING OCCURRENCE OF COLOR ERRORS

CROSS-REFERENCE TO RELATED APPLICATION

This application claims the priority benefit of Taiwan application serial no. 97116984, filed on May 8, 2008. The entirety of the above-mentioned patent application is hereby incorporated by reference herein and made a part of specification.

BACKGROUND OF THE INVENTION

1. Field of the Invention

The present invention relates to a liquid crystal display (LCD). More particularly, the present invention relates to a switching voltage controlling circuit of an LCD.

2. Description of Related Art

As the photoelectric industry advances, LCDs have been applied extensively to various kinds of electronic products. It should be mentioned that the LCD can barely provide equivalent switching voltages to each pixel unit due to the increasing dimension of a display panel of the LCD, and color errors then occur between blocks of the display panel. Detailed descriptions accompanying drawings are provided hereinafter.

FIG. 1A is a schematic view of a conventional LCD. FIG. 1B is a schematic view of a pixel unit of the conventional LCD. Referring to FIGS. 1A and 1B, an LCD 10 has a normally white frame when liquid crystals contained in the LCD 10 are not driven. The LCD 10 is composed of a display panel 40, a plurality of source drivers 20, and a plurality of gate drivers 31, 32, and 33. The source drivers 20 are coupled to each pixel unit 41 through source driving lines 101. On the other hand, the gate drivers 31, 32, and 33 are coupled to each of the pixel units 41 through gate driving lines 111, respectively. Each of the pixel units 41 includes a transistor 121, a storage capacitor 122, and a pixel capacitor 123.

FIG. 2 is a curve illustrating a relationship between a source driving current Id and a switching voltage Vg. Referring to FIGS. 1A, 1B, and 2, the gate drivers 31, 32, and 33 receive a constant voltage VGL and thereby generate the switching voltage Vg for controlling each of the pixel units 41. It should be noted that a transmission line 131 of the display panel 40 has a line resistance, and therefore the constant voltage VGL received by the gate driver 31 is slightly greater than the constant voltage VGL received by the gate driver 32. Besides, the constant voltage VGL received by the gate driver 32 is slightly greater than the constant voltage VGL received by the gate driver 33.

Based on the above, the switching voltage Vg provided by the gate driver 33 to the pixel unit 41 is slightly less than the switching voltage Vg provided by the gate driver 32 to the pixel unit 41, and the switching voltage Vg provided by the gate driver 32 to the pixel unit 41 is slightly less than the switching voltage Vg provided by the gate driver 31 to the pixel unit 41. Owing to the difference in the switching voltage Vg respectively received by each block of the display panel 40, the color errors may arise between the blocks of the display panel 40. Specifically, when the LCD 10 displays frames at the same color level, the pixel unit 41 of the gate driver 33 of the LCD 40 is somewhat brighter than the pixel unit 41 of the gate driver 32, and the pixel unit 41 of the gate driver 32 of the LCD 40 is somewhat brighter than the pixel unit 41 of the gate driver 31. The above description is, for instance, exemplified in FIG. 3 that is a schematic view of a display panel in which color errors occur between the blocks.

FIG. 4 is a schematic view of another conventional LCD. In order to prevent the color errors occurring between the blocks of the display panel, a solution in which a current-limiting resistor 141 is additionally disposed between the constant voltage VGL and the gate driver 31 is proposed according to the pertinent art. After the current-limiting resistor 141 is disposed, the equivalent resistance of the transmission line 131 is increased, and a current passing through the transmission line 131 is then decreased when the constant voltage VGL remains unchanged. As a result, the voltage difference in the constant voltage VGL respectively received by the gate drivers 31, 32, and 33 is reduced. As such, the difference in the switching voltage Vg respectively generated by the gate drivers 31, 32, and 33 is reduced as well. The color errors occurring between the blocks of the display panel 40 are then eliminated.

Nevertheless, the occurrence of color errors between the blocks of the display panel 40 can only be precluded by employing the current-limiting resistors 141 with different resistance values when different display panels 40 are used. That is to say, given that different types of the display panels 40 are used, the display panel manufacturers must find the proper resistance value for each type of the display panel by way of trial and error, which is time-consuming and inconvenient.

SUMMARY OF THE INVENTION

The present invention is directed to a switching voltage controlling circuit for prohibiting an occurrence of color errors between blocks of a display panel.

The present invention is further directed to an LCD in which the aforesaid switching voltage controlling circuit is directly configured, so as to reduce the occurrence of the color errors between the blocks of the display panel.

The present invention provides a switching voltage controlling circuit adapted to an LCD. The LCD includes a display panel and a plurality of gate drivers. The display panel includes a plurality of pixel units. The switching voltage controlling circuit includes a current-controlled switch, a transmission line, and a feedback circuit. The current-controlled switch has a first terminal and a second terminal, wherein the first terminal of the current-controlled switch is coupled to a constant voltage. The transmission line has a first terminal and a second terminal, wherein the first terminal of the transmission line is coupled to the second terminal of the current-controlled switch. Besides, the transmission line is serially coupled to the gate drivers. Each of the gate drivers generates a switching voltage according to a voltage provided by the transmission line and controls the pixel units of the display panel. The feedback circuit is coupled to the transmission line and the current-controlled switch. Additionally, the feedback circuit regulates an amount of a current passing through the current-controlled switch according to a voltage difference between the first terminal and the second terminal of the transmission line.

According to an embodiment of the present invention, the current-controlled switch is a transistor operated in an active region.

According to an embodiment of the present invention, the feedback circuit includes a first amplifier, a first voltage dividing resistor, a second voltage dividing resistor, and a second amplifier. A first input terminal and a second input terminal of the first amplifier are coupled to the first terminal and the second terminal of the transmission line, respectively. A first terminal of the first voltage dividing resistor is coupled to an output terminal of the first amplifier. A first terminal and a second terminal of the second voltage dividing resistor are coupled to a second terminal of the first voltage dividing resistor and a first voltage, respectively. A first input terminal and a second input terminal of the second amplifier are coupled to the second terminal of the first voltage dividing resistor and a second voltage, respectively. An output terminal of the second amplifier outputs a control voltage for regulating the amount of the current passing through the current-controlled switch. According to another embodiment of the present invention, the first voltage is a ground voltage, and the second voltage is greater than the first voltage.

From another perspective, the present invention provides an LCD having the aforesaid switching voltage controlling circuit, such that the color errors occurring between the blocks of the display panel can be reduced.

The voltage difference between the two terminals of the transmission line is monitored by the feedback circuit according to the present invention, and thereby the current passing through the transmission line is controlled. Hence, the transmission line is able to provide the voltages close to the same level for each driving circuit, such that the color errors occurring between the blocks of the display panel can be decreased.

To make the aforesaid features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1A:
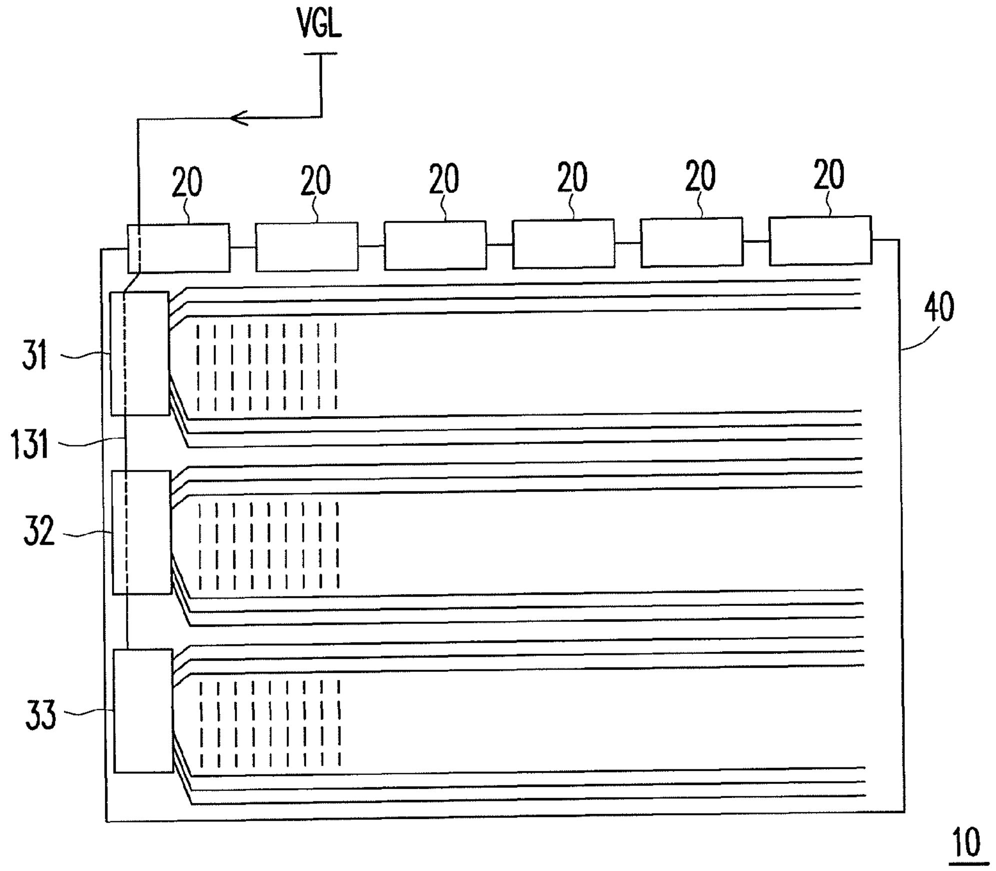
FIG. 1A (PRIOR ART)
FIG. 1A is a schematic view of a conventional LCD.
Figure 1B:
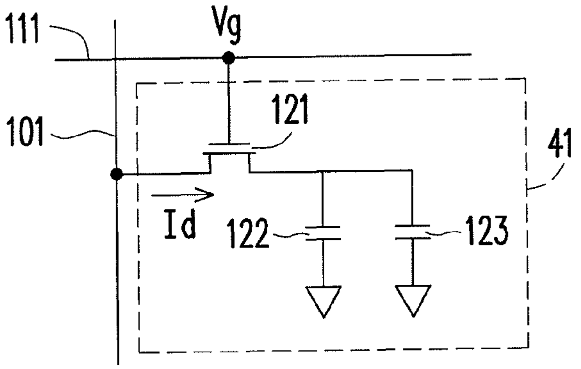
FIG. 1B (PRIOR ART)
FIG. 1B is a schematic view of a pixel unit of the conventional LCD.
Figure 2:
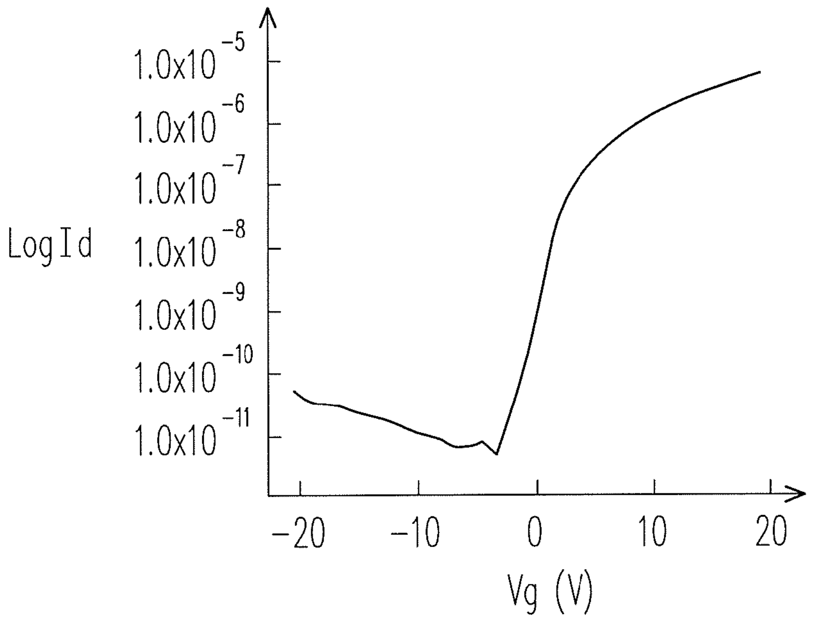
FIG. 2 (PRIOR ART)
FIG. 2 is a curve illustrating a relationship between a source driving current Id and a switching voltage Vg.
Figure 3:
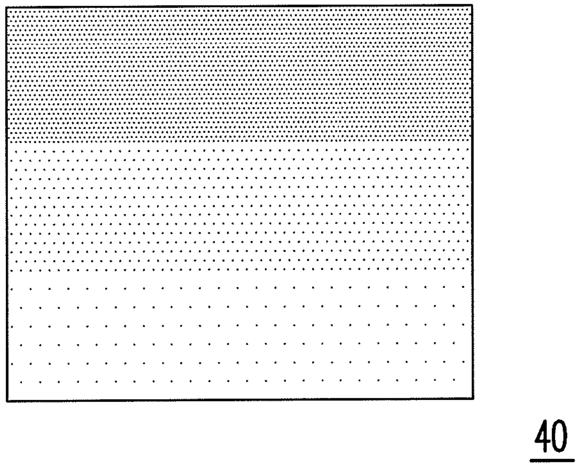
FIG. 3 (PRIOR ART)
FIG. 3 is a schematic view of a display panel in which color errors occur between blocks.
Figure 4:
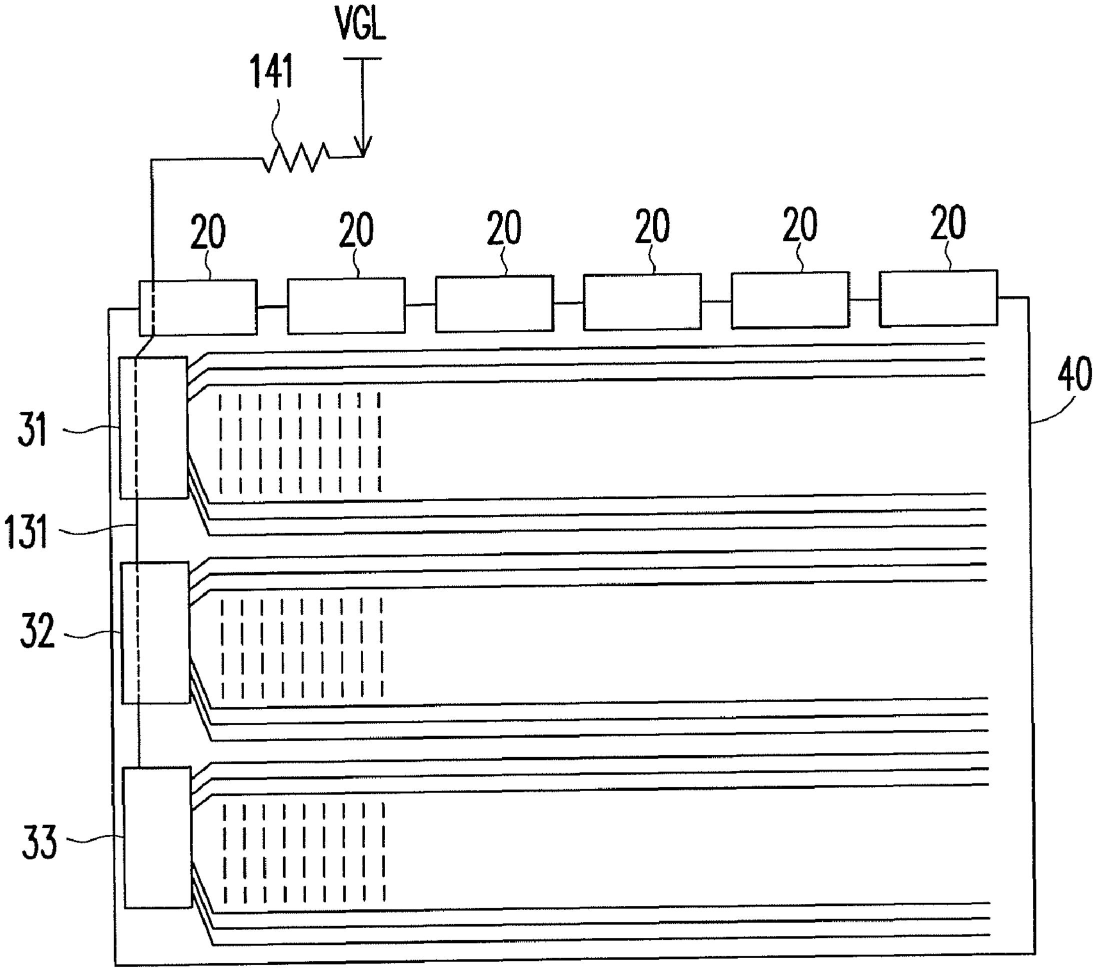
FIG. 4 (PRIOR ART)
FIG. 4 is a schematic view of another conventional LCD.
Figure 5A:
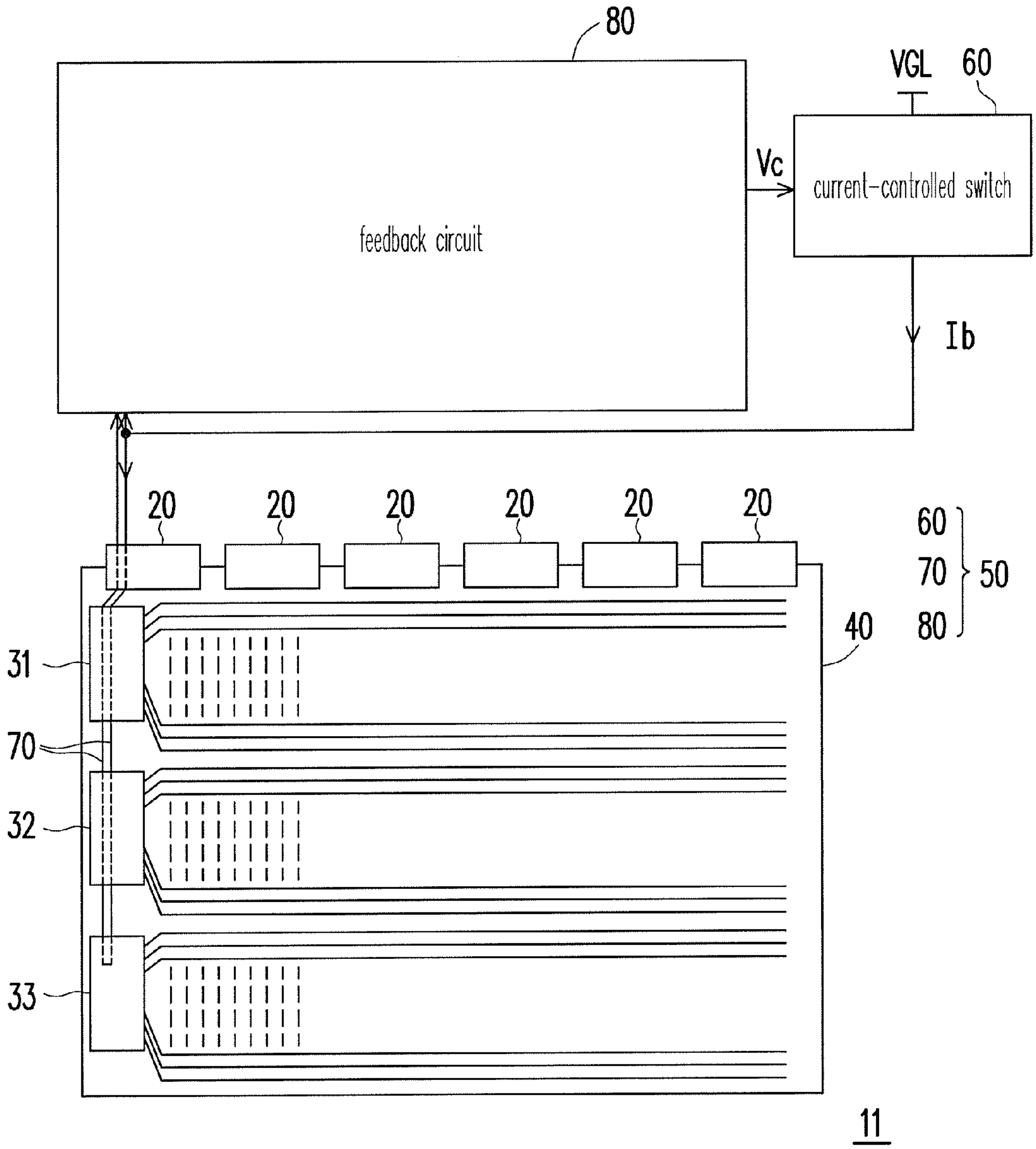
FIG. 5A is a schematic view of an LCD and a switching voltage controlling circuit of the LCD according to a first embodiment of the present invention.

FIG. 5A is a schematic view of an LCD and a switching voltage controlling circuit of the LCD according to a first embodiment of the present invention. Referring to FIGS. 5A and 1B, an LCD 11 includes a display panel 40, a plurality of gate drivers (marked as 31, 32, and 33 in the present embodiment), a plurality of source drivers 20, and a switching voltage controlling circuit 50. The switching voltage controlling circuit 50 includes a current-controlled switch 60, a transmission line 70, and a feedback circuit 80. The display panel 40 includes a plurality of pixel units 41. The source drivers 20 and the gate drivers 31, 32, and 33 can be disposed in a non-display region of the display panel 40. The source drivers 20 are respectively coupled to each of the pixel units 41 through source driving lines 101. On the other hand, the gate drivers 31, 32, and 33 are coupled to each of the pixel units 41 through gate driving lines 111, respectively. The source drivers 20 and the gate drivers 31, 32, and 33 can be used to control the pixel units 41. Each of the pixel units 41 includes a transistor 121, a storage capacitor 122, and a pixel capacitor 123.

A first terminal and a second terminal of the current-controlled switch 60 are respectively coupled to a constant voltage VGL and a first terminal of the transmission line 70. Here, the current-controlled switch 60 controls a current Ib passing through the current-controlled switch 60 based on a control voltage Vc provided by the feedback circuit 80. The transmission line 70 is serially coupled to the gate drivers 31, 32, and 33 in sequence. The transmission line 70 has a line resistance. Hence, the longer a transmission path between each of the gate drivers 31, 32, and 33 and the constant voltage VGL is, the lower the voltage received by each of the gate drivers 31, 32, and 33 is. Specifically, the transmission path between the gate driver 33 and the constant voltage VGL is longer than the transmission path between the gate driver 32 and the constant voltage VGL, and the transmission path between the gate driver 32 and the constant voltage VGL is longer than the transmission path between the gate driver 31 and the constant voltage VGL. As a result, the voltage received by the gate driver 33 from the transmission line 70 is less than the voltage received by the gate driver 32 from the transmission line, and the voltage received by the gate driver 32 from the transmission line 70 is also less than the voltage received by the gate driver 31 from the transmission line 70.

The gate drivers 31, 32, and 33 generate the switching voltage Vg according to the respective voltages received from the transmission line 70 and thereby control each of the pixel units 41. Therefore, given that the respective voltages received by each of the gate drivers 31, 32, and 33 from the transmission line 70 differ from one another to a certain degree, color errors may occur between blocks of the display panel 40. In accordance with the Ohm's Law, the line resistance of the transmission line 70 can scarcely affect the respective voltages received by each of the gate drivers 31, 32, and 33, given that the current Ib is of a relatively small value. In other words, the respective voltages received by each of the gate drivers 31, 32, and 33 from the transmission line 70 are more prone to reach similar values. (Note: the switching voltage discussed in the present invention is referred to as a turn-on voltage or a turn-off voltage.)

In light of the foregoing, the feedback circuit 80 is employed in the present embodiment for controlling the current Ib. A first input terminal and a second input terminal of the feedback circuit 80 are coupled to the first terminal and a second terminal of the transmission line 70, respectively. That is to say, the feedback circuit 80 is capable of generating the control voltage Vc based on the voltage difference between the first terminal and the second terminal of the transmission line 70 and providing the same to the current-controlled switch 60, so as to control the amount of the current Ib. In detail, as the voltage difference between the first terminal and the second terminal of the transmission line 70 exceeds a predetermined value, the feedback circuit 80 may reduce the amount of the current Ib to prevent the occurrence of the color errors between the blocks of the display panel 40. In order to have people skilled in the art understand the present invention, the feedback circuit 80 and the current-controlled switch 60 are embodied hereinafter.

Figure 5B:
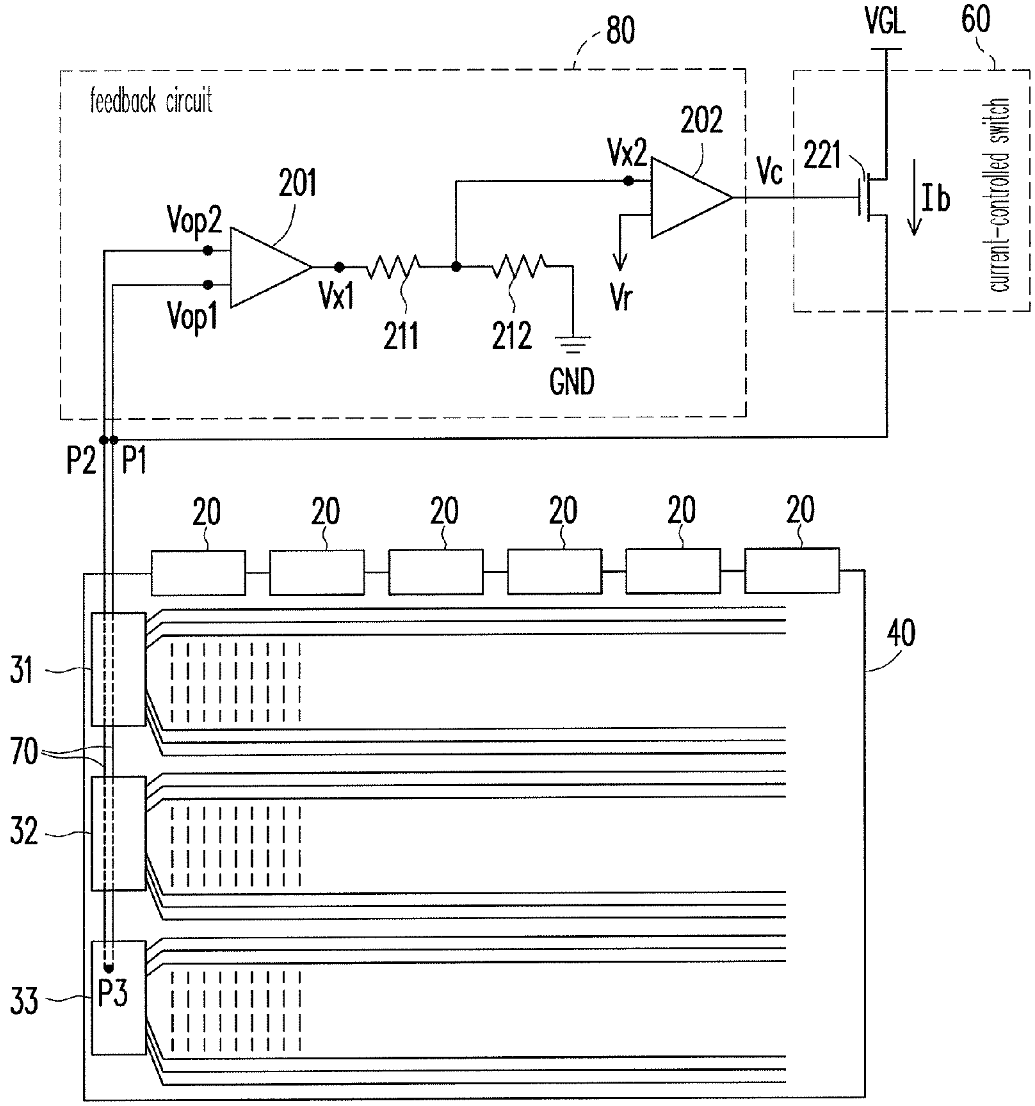
FIG. 5B is a circuit diagram of a feedback circuit and a current-controlled switch according to the first embodiment of the present invention.

FIG. 5B is a circuit diagram of the feedback circuit and the current-controlled switch according to the first embodiment of the present invention. Referring to FIG. 5B, the current-controlled switch 60 is exemplified as a transistor 221 operated in an active region according to the present embodiment. Variations in the control voltage Vc received by a gate terminal of the transistor 221 may result in a difference in the amount of the current Ib passing through the transistor 221. In particular, according to the present embodiment, when the control voltage Vc has a relatively large value, the amount of the current Ib is correspondingly increased. On the contrary, when the control voltage Vc has a relatively small value, the amount of the current Ib is correspondingly decreased.

On the other hand, the feedback circuit 80 includes two amplifiers 201 and 202 and two voltage dividing resistors 211 and 212. A first input terminal and a second input terminal of the amplifier 210 are coupled to the first terminal and the second terminal of the transmission line 70, respectively. Here, the amplifier 210 generates a voltage Vx1 based on the voltage difference between the first terminal and the second terminal of the transmission line 70. In detail, suppose the voltage at the first terminal of the transmission line 70 is Vop1 and the voltage at the second terminal of the transmission line 70 is Vop2, the voltage Vx1 is equal to Vop1−Vop2 (Vx1=Vop1−Vop2). Since the voltage Vop1 is greater than the voltage Vop2, the voltage Vx1 is larger than a ground voltage GND.

A first terminal of the voltage dividing resistor 211 is coupled to an output terminal of the amplifier 201. A first terminal and a second terminal of the voltage dividing resistor 212 are coupled to a second terminal of the voltage dividing resistor 211 and the ground voltage GND, respectively. In view of the theorem of voltage division, the voltage dividing resistors 211 and 212 can generate a voltage Vx2 based on the voltage Vx1, and the voltage Vx1 is greater than the voltage Vx2. A first input terminal and a second input terminal of the amplifier 202 are coupled to the second terminal of the voltage dividing resistor 211 and a voltage Vr, respectively, and thereby the control voltage Vc is generated. Here, the control voltage Vc=Vr−Vx2. Besides, the amount of the current passing through the current-controlled switch 60 can be adjusted according to the control voltage Vc. It is likely for people skilled in the art to define the voltage Vr based on actual demands, while it should be taken into account that the voltage Vr of the present embodiment must be greater than the ground voltage GND, such that the control voltage Vc can be stabilized.

According to the present embodiment, the use of the voltage dividing resistors 211 and 212 for generating the voltage Vx2 is conducive to adjusting the voltage Vx2 in a flexible manner. The line resistance between terminals P1 and P3 is similar to that between terminals P2 and P3, and thus the voltage difference between the terminals P1 and P3 is also similar to that between the terminals P2 and P3. The voltage dividing resistors 211 and 212 having the same resistance value are used for accurately estimating the voltage difference between the terminals P1 and P3. As such, the voltage Vx2 denotes the voltage difference between the terminals P1 and P3.

People skilled in the art should be aware that FIG. 5B merely depicts one embodiment of the feedback circuit 80 and the current-controlled switch 60, which is not limited in the present invention. In other embodiments, people skilled in the art are able to modify the above embodiment based on the actual demands. For example, the voltage dividing resistors 211 and 212 having different resistance values can be used.

Referring to FIG. 5B again, as discussed hereinbefore, the voltage difference between the terminals P1 and P3 is increased when the amount of the current Ib is excessively large, leading to the occurrence of the color errors between the blocks of the display panel 40. Meanwhile, the voltage Vx1 obtained by subtracting the voltage Vop2 from the voltage Vop1 and the voltage Vx2 are increased as well. As such, the control voltage Vc obtained by subtracting the voltage Vx2 from the voltage Vr is decreased. Since the amount of the current Ib is relevant to the value of the control voltage Vc, the amount of the current Ib is reduced together with the decrease in the value of the control voltage Vc. Hence, the voltage difference between the terminals P1 and P3 is correspondingly reduced. Namely, the voltage difference between the terminals P1 and P3 is stabilized to be close to the voltage Vr.

From another perspective, the voltage difference between the terminals P1 and P3 is decreased when the amount of the current Ib is excessively small. In the meantime, the voltage Vx1 obtained by subtracting the voltage Vop2 from the voltage Vop1 and the voltage Vx2 are decreased as well. As such, the control voltage Vc obtained by subtracting the voltage Vx2 from the voltage Vr is increased. Since the amount of the current Ib is relevant to the value of the control voltage Vc, the amount of the current Ib is increased together with the increase in the value of the control voltage Vc. Hence, the voltage difference between the terminals P1 and P3 is correspondingly enhanced. Namely, the voltage difference between the terminals P1 and P3 is stabilized to be close to the voltage Vr. As such, the occurrence of the color errors between the blocks of the display panel 40 can be reduced.

In comparison with the related art, the present embodiment is directed to avoiding the occurrence of the color errors between the blocks of the display panel due to the use of the current-limiting resistors having constant values. On the other hand, the feedback circuit of the present embodiment can be applied to the panels of different dimensions, and therefore it is not necessary to, by way of trial and error, place the current-limiting resistors having different values onto various panels.

Note that although the above embodiment has disclosed a possible type of the LCD and the switching voltage controlling circuit thereof, it is common sense to people of ordinary knowledge in this art that different manufacturers may develop different designs of the LCDs and the switching voltage controlling circuits thereof, and the application of the present invention should not be limited to this type only. Namely, using the feedback circuit for modulating the voltage difference between each of the gate drivers and for adjusting the current passing through each of the gate drivers to reduce the occurrence of the color errors between the blocks of the display panel should be deemed to have conformed to the essence of the present invention. Some other embodiments are further discussed hereinafter to allow people skilled in the art to recognize and embody the present invention.

Second Embodiment

Figure 6:
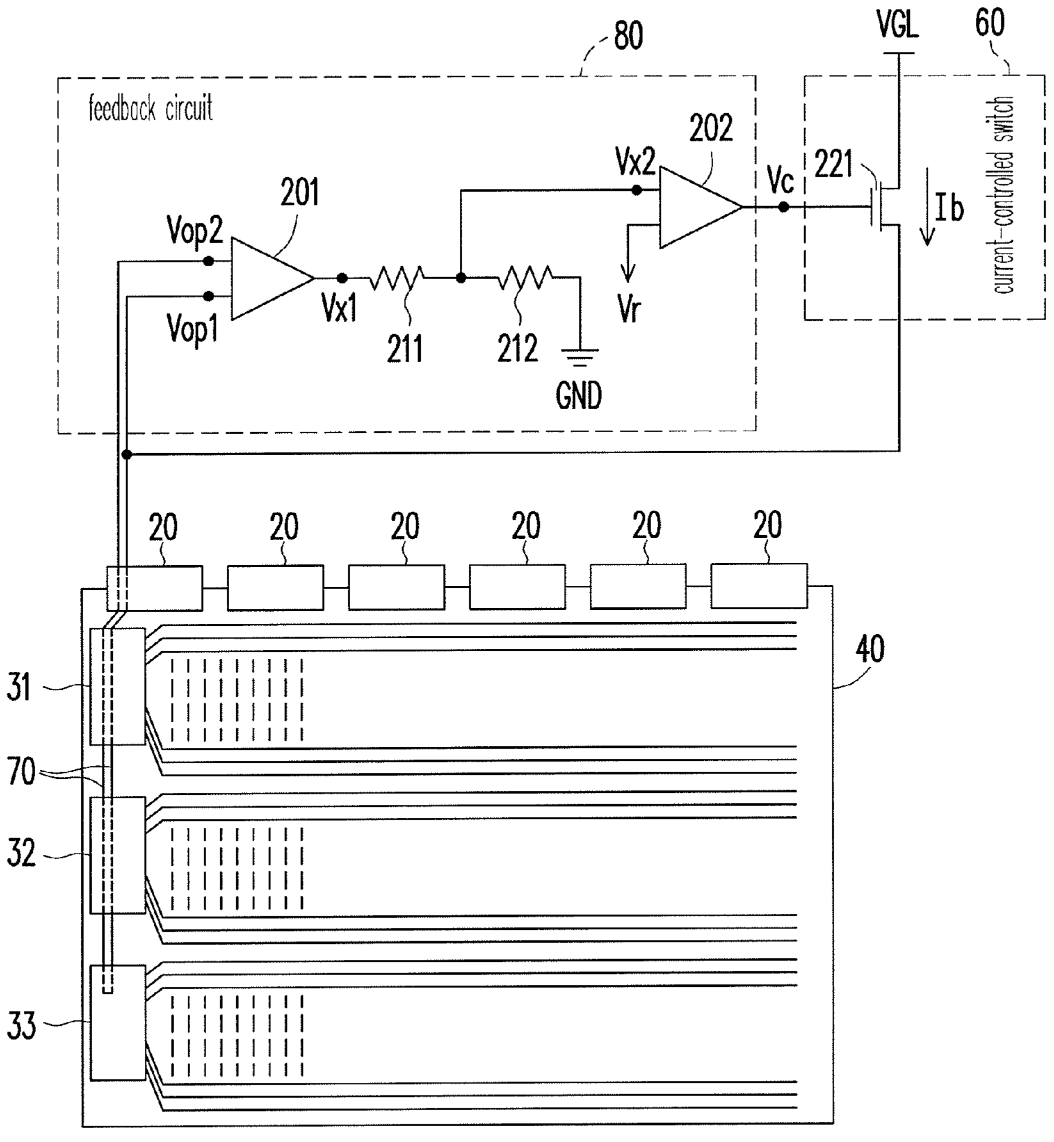
FIG. 6 is a schematic view of an LCD and a switching voltage controlling circuit of the LCD according to a second embodiment of the present invention.
Figure 7:
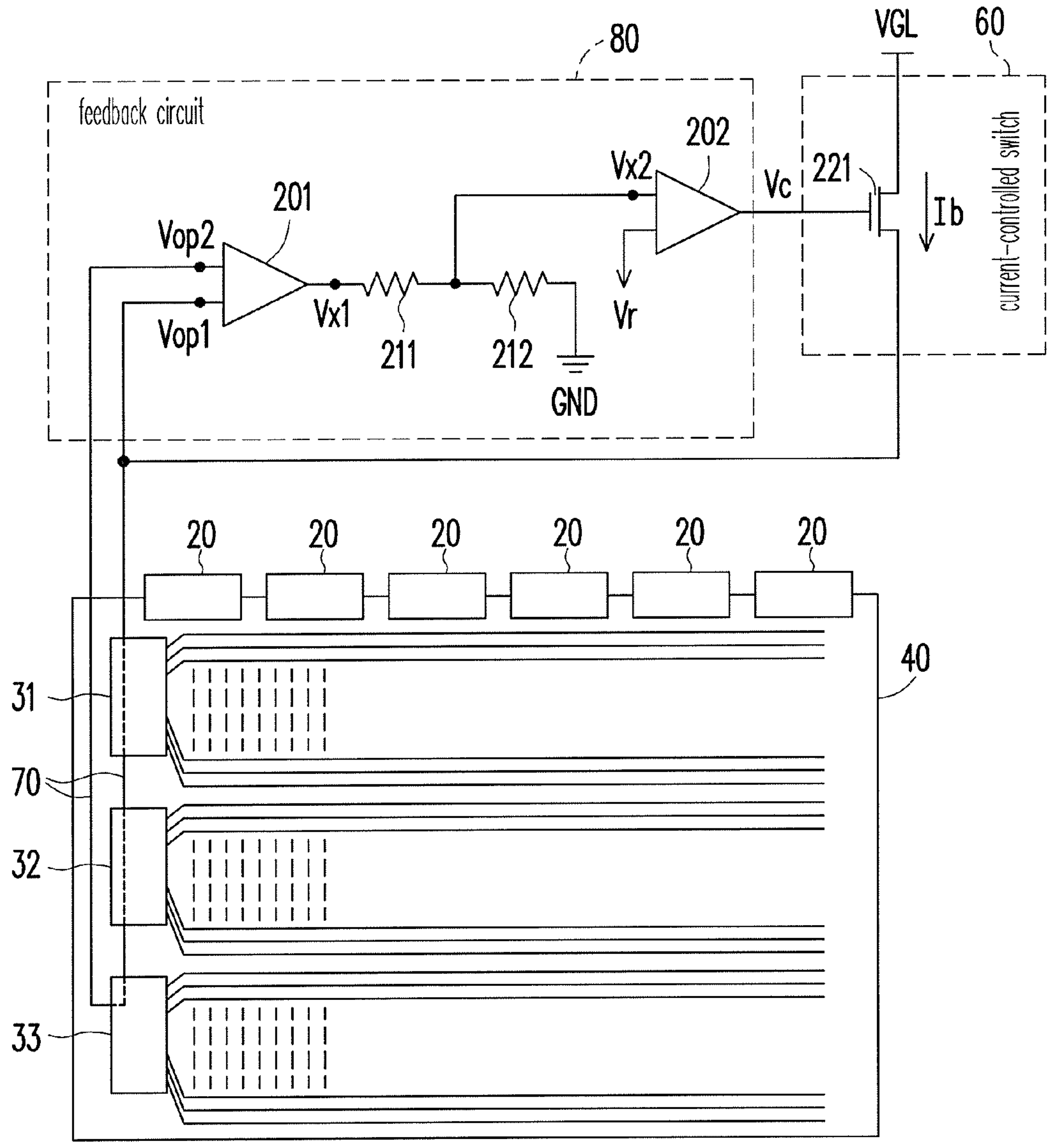
FIG. 7 is a schematic view of another LCD and a switching voltage controlling circuit of the LCD according to the second embodiment of the present invention.

People skilled in the art are able to change traces of the transmission line 70 introduced in the first embodiment based on the actual demands. FIG. 6 is a schematic view of an LCD and a switching voltage controlling circuit of the LCD according to a second embodiment of the present invention. Please refer to FIGS. 5B and 6 which are similar figures. Descriptions of the same reference numbers used to refer to the same parts in FIGS. 6 and 5B will be omitted. Note that the traces of the transmission line 70 in FIG. 6 pass through the source drivers 20. As such, the transmission line 70 of the present embodiment can be arranged in a more feasible way without sacrificing the technical effects achieved in the first embodiment. FIG. 7 is a schematic view of another LCD and a switching voltage controlling circuit of the LCD according to the second embodiment of the present invention. Referring to FIG. 7, people skilled in the art can accomplish the technical effects that are similar to those provided in FIG. 6 by proportionally adjusting the resistance value of the voltage dividing resistors 211 and 212.

To sum up, the voltage difference between the two terminals of the transmission line is monitored by the feedback circuit according to the present invention, and thereby the current passing through the transmission line is controlled. As a result, the transmission line is able to provide the voltages close to the same level for each driving circuit, and thus the color errors occurring between the blocks of the display panel can be reduced. In comparison with the related art, the present invention can effectively prohibit the occurrence of the color errors between the blocks of the display panel due to the use of the current-limiting resistors having constant values. On the other hand, the feedback circuit of the present embodiment can be applied to the panels of different dimensions, and therefore it is not necessary to, by way of trial and error, place the current-limiting resistors having different values onto various panels.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switching voltage controlling circuit that is adapted to a liquid crystal display (LCD), the LCD comprising a display panel and a plurality of gate drivers, the display panel comprising a plurality of pixel units, the switching voltage controlling circuit comprising:

a current-controlled switch, having a first terminal and a second terminal, the first terminal being coupled to a constant voltage;

a transmission line, having a first terminal and a second terminal, the first terminal being coupled to the second terminal of the current-controlled switch, the transmission line being serially coupled to the gate drivers, wherein the gate drivers generate a switching voltage according to a voltage provided by the transmission line and control the pixel units; and a feedback circuit, coupled to the transmission line and the current-controlled switch, the feedback circuit regulating an amount of a current passing through the current-controlled switch according to a voltage difference between the first terminal and the second terminal of the transmission line, wherein the feedback circuit comprises:

a first amplifier, a first input terminal and a second input terminal of the first amplifier being coupled to the first terminal and the second terminal of the transmission line, respectively;

a first voltage dividing resistor, a first terminal of the first voltage dividing resistor being coupled to an output terminal of the first amplifier;

a second voltage dividing resistor, a first terminal and a second terminal of the second voltage dividing resistor being coupled to a second terminal of the first voltage dividing resistor and a first voltage, respectively; and a second amplifier, a first input terminal and a second input terminal of the second amplifier being coupled to the second terminal of the first voltage dividing resistor and a second voltage, an output terminal of the second amplifier outputting a control voltage for regulating the amount of the current passing through the current-controlled switch.

2. The switching voltage controlling circuit as claimed in claim 1, wherein the current-controlled switch is a transistor operated in an active region.

3. The switching voltage controlling circuit as claimed in claim 1, wherein the first voltage is a ground voltage, and the second voltage is greater than the first voltage.

4. A liquid crystal display (LCD), comprising:

a display panel, comprising a plurality of pixel units;

a plurality of gate drivers, coupled to the pixel units;

a current-controlled switch, having a first terminal and a second terminal, the first terminal of the current-controlled switch being coupled to a constant voltage;

a transmission line, a first terminal of the transmission line being coupled to the second terminal of the current-controlled switch, the transmission line being serially coupled to the gate drivers, wherein the gate drivers generate a switching voltage according to a voltage provided by the transmission line and control the pixel units; and a feedback circuit, coupled to the transmission line and the current-controlled switch, the feedback circuit regulating an amount of a current passing through the current-controlled switch according to a voltage difference between the first terminal and a second terminal of the transmission line, wherein the feedback circuit comprises:

a first amplifier, a first input terminal and a second input terminal of the first amplifier being coupled to the first terminal and the second terminal of the transmission line, respectively;

a first voltage dividing resistor, a first terminal of the first voltage dividing resistor being coupled to an output terminal of the first amplifier;

a second voltage dividing resistor, a first terminal and a second terminal of the second voltage dividing resistor being coupled to a second terminal of the first voltage dividing resistor and a first voltage, respectively; and a second amplifier, a first input terminal and a second input terminal of the second amplifier being coupled to the second terminal of the first voltage dividing resistor and a second voltage, an output terminal of the second amplifier outputting a control voltage for regulating the amount of the current passing through the current-controlled switch.

5. The LCD as claimed in claim 4, wherein the current-controlled switch is a transistor operated in an active region.

6. The LCD as claimed in claim 4, wherein the first voltage is a ground voltage, and the second voltage is greater than the first voltage.

* * * * *